United States Patent [19]

Fricke

[11] 4,121,916
[45] Oct. 24, 1978

[54] PORTABLE AIR PURGE

[76] Inventor: Roy A. Fricke, 1034 Ashland Ave., River Forest, Ill. 60305

[21] Appl. No.: 735,497

[22] Filed: Oct. 26, 1976

[51] Int. Cl.² .............................................. B01D 50/00
[52] U.S. Cl. ...................................... 55/316; 55/357; 55/411; 55/472; 55/485; 55/503; 55/509; 55/518
[58] Field of Search ................. 55/316, 323, 327, 329, 55/337, 357, 411, 412, 472, 485, 503, 509, 518, 519, 387, 512, 517; 23/288 FC

[56] References Cited

U.S. PATENT DOCUMENTS

| | | | |
|---|---|---|---|
| 1,786,756 | 12/1930 | Juelson | 55/472 |
| 2,010,424 | 8/1935 | Wilson et al. | 55/329 |
| 2,087,688 | 7/1937 | Johnson | 55/503 |
| 2,478,054 | 8/1949 | Ray et al. | 55/357 |
| 2,577,606 | 12/1951 | Conley | 55/503 |
| 3,018,841 | 1/1962 | Gerlich | 55/518 |
| 3,189,418 | 6/1965 | Gary | 23/288 FC |
| 3,381,774 | 5/1968 | Stade et al. | 55/485 |
| 3,672,126 | 6/1972 | Goettle | 55/316 |
| 3,804,942 | 8/1974 | Kato et al. | 55/472 |
| 3,936,284 | 2/1976 | Mason | 55/472 |
| 3,966,442 | 6/1976 | Waters | 55/316 |

FOREIGN PATENT DOCUMENTS

| | | | |
|---|---|---|---|
| 979,768 | 12/1975 | Canada | 55/316 |
| 303,961 | 1/1929 | United Kingdom | 55/357 |

Primary Examiner—Frank W. Lutter
Assistant Examiner—David L. Lacey
Attorney, Agent, or Firm—John A. Dienner

[57] ABSTRACT

The present invention provides a portable, motor driven air purifying instrument for purging impurities from the atmosphere about the user, i.e., from a more or less localized or confined body of air such as that in a room or in an automobile. It is designed to be used as a personal adjunct for purifying the atmosphere or body of air about a person with whom it is associated. It is designed for use indoors, i.e., in an enclosed or limited space.

4 Claims, 5 Drawing Figures

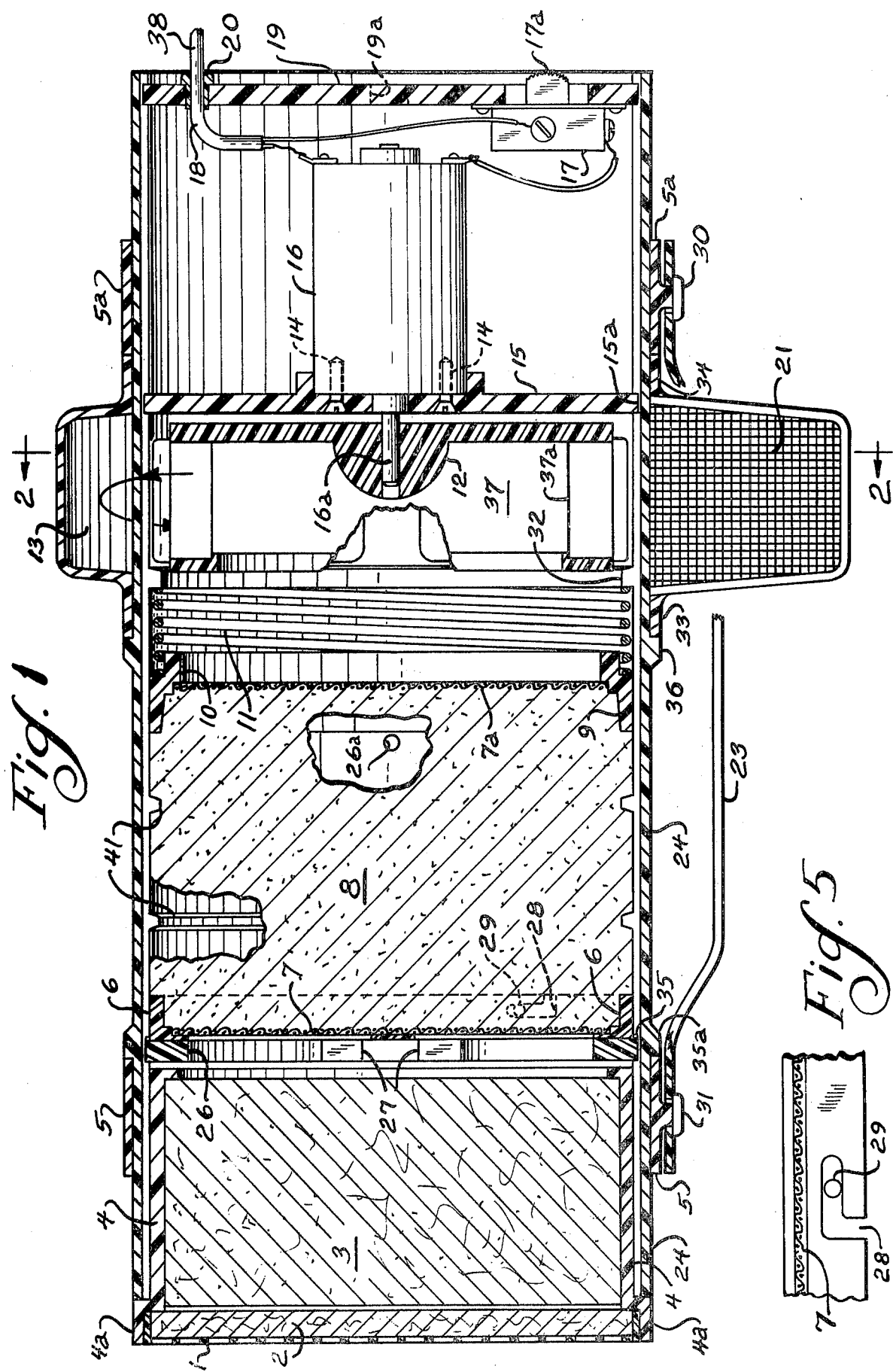

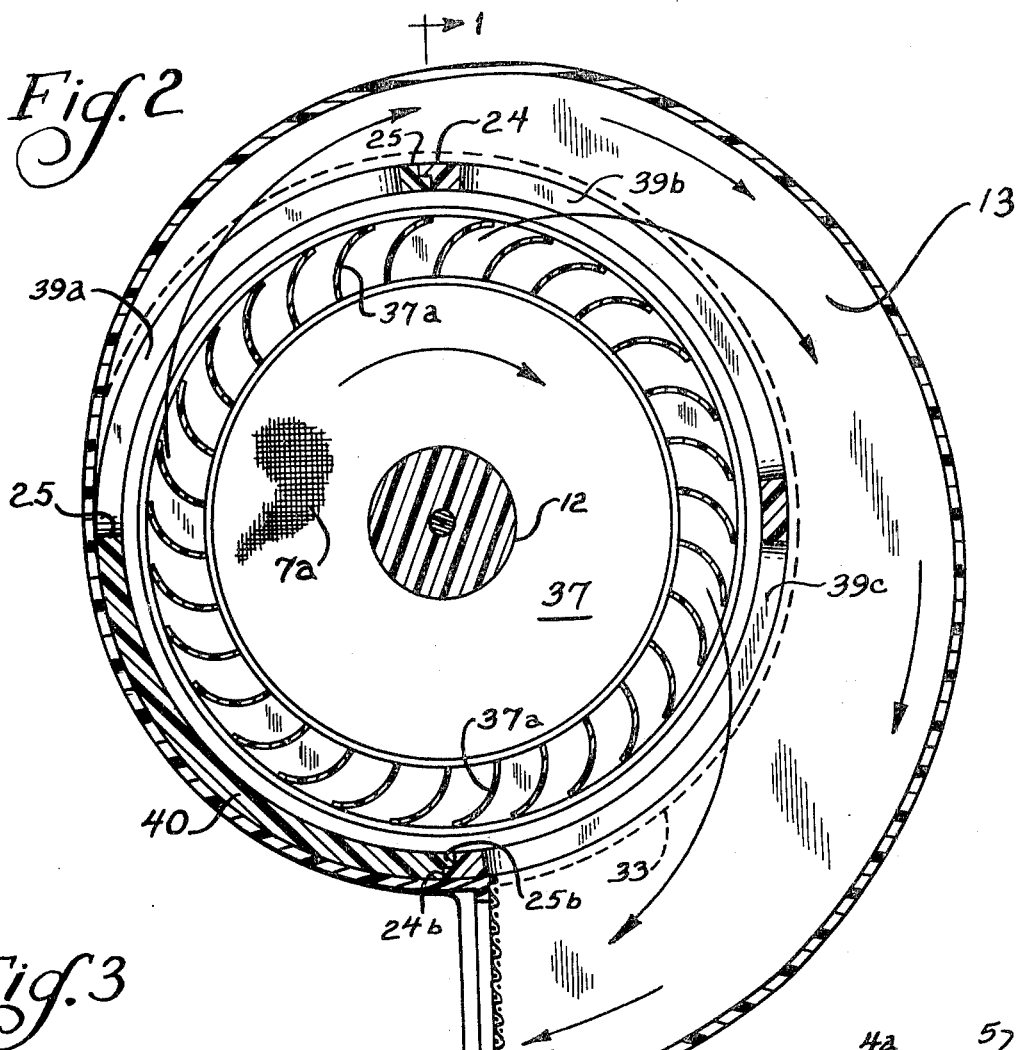
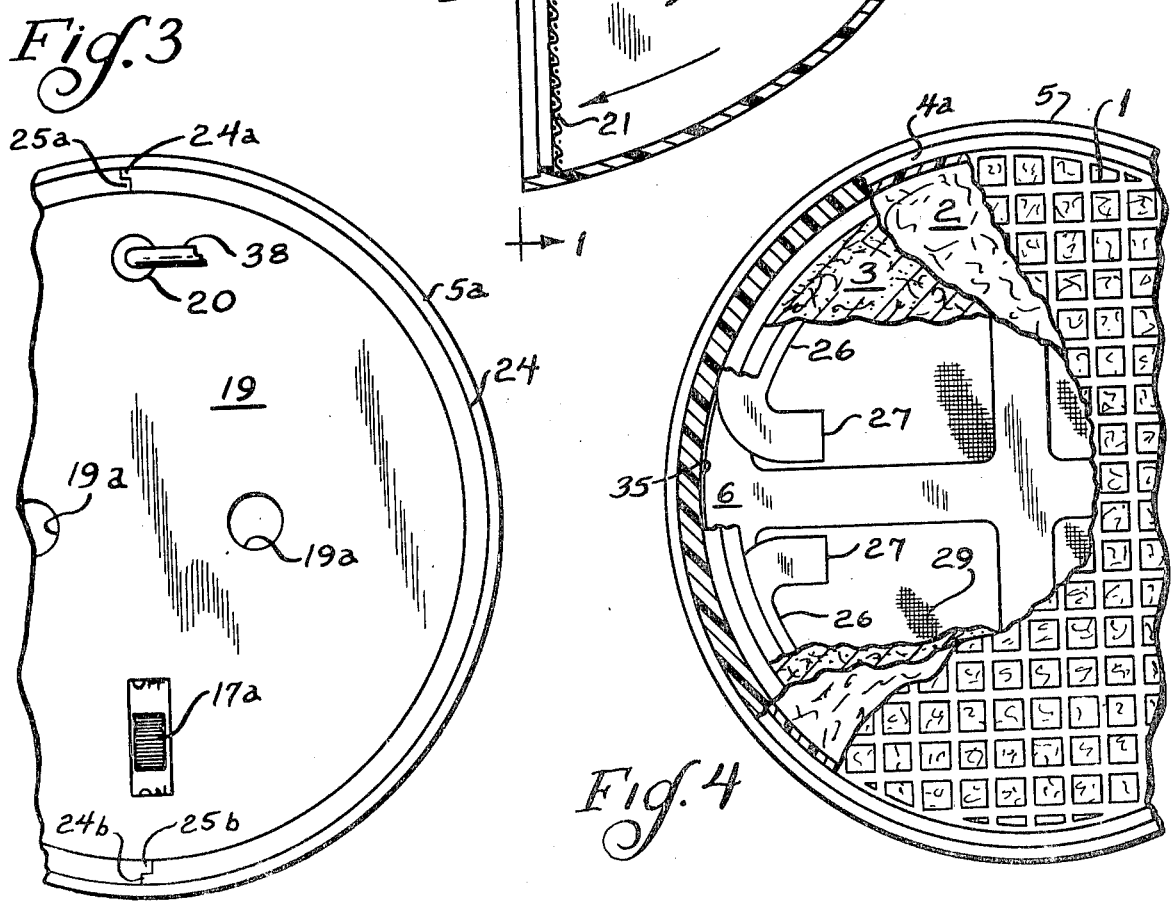

PORTABLE AIR PURGE

BACKGROUND OF THE INVENTION

There is need for a small, portable, power operated air purifier by persons suffering from respiratory ailments and/or allergies to airborne particulates such as dust, pollen, tobacco smoke, molds and so forth and/or to irritating or toxic gases such as ozone, sulfur dioxide, oxides of nitrogen, small amounts of carbon monoxide and others that occur in many city localities. Some of these offending substances are of sufficient public concern that daily advisories are supplied to the public by newspaper or television.

The invention provides a means by which the user may set up and direct a stream or blanket of purified air to his face and to other parts of his person or into the room or other enclosure which he occupies. The device herein disclosed is highly desirable for use by a person traveling in an automobile and in particular in a vehicle such as an ambulance.

In brief, two kinds of irritating or injurious substances are to be eliminated, namely irritating solids which permit elimination by filtration and gaseous irritants that can be eliminated only by adsorption of neutralization.

For many individuals the so-called hay fever season brings with it breathing discomfort that makes the sufferer resort to such relief as he can obtain while virtually a prisoner in his own home. The alternative is to move to a location free of irritants.

For many people breathing may be difficult the year around. This is particularly true in cities where in addition to ozone, pollen, bacteria, molds, spores, ragweed and the like, various chemical impurities foul the atmosphere, some of them continuously the year around. People with respiratory problems, young children, the elderly, and the ill are particularly affected.

The air purifying device of the present invention is light in weight and readily portable. It cleanses the air through the purifying effect of a mechanical filter to take out particulate matter and in series therewith a bed of activated carbon which is capable of molecular activity and which eliminates virtually all of the common air pollutants including cigarette smoke and most of the ordinary unpleasant odors. Furthermore, it will reduce eye and throat irritation in many difficult situations.

The air in our cities suffers from the presence of ozone, pollen grains, cigarette smoke, bacteria, molds, spores, ragweed, sulfur oxides, nitrogen oxides, hydrocarbon vapors and residues and other impurities for relief from which there is a present unsatisfied need.

SUMMARY OF THE INVENTION

The invention is advantageously embodied in a mall, portable, hand held air purifier, suitable to be operated by battery current of an automobile, for use in such a vehicle, and adapted for operation by house current for residential use. The device of the invention provides a small, compact, portable, power operated filter having a removal efficiency of 99.97% of airborne particulate matter of 0.3 micron size or larger. Under laboratory tests the filter of the present invention produces class 100 bio-clean air (not more than 100 particles of 0.5 micron in diameter or larger, per cubic foot of air).

OBJECTS OF THE INVENTION

The chief object of the present invention is to provide a small, portable, high efficiency air purifier unit suitable for personal use. The unit preferably is designed to be used on either A. C. or D. C. current, consuming about 40 watts. The D. C. model is particularly adaptable for use in motor vehicles by persons suffering from respiratory ailments and/or allergies.

Another important object of the invention is to provide a device that in addition to being of high efficiency, is economical both in its initial cost and in its maintenance cost.

It is a further object of the invention to make it easy for the operator to change the filtering and/or purifying components without requiring any special tools. The present invention aims further to provide a device which operates quietly with a gentle air flow (without turbulence) through the pre-filter, through a mass of fibrous material which serves as the particulate filter in a straight line of flow into and through a thick heavy bed of activated carbon that is held in compression by a pressure plate and coil spring.

It is a further object to maintain a turbulence-free, gentle, flow of air through a bed of activated carbon without allowing the air to laminate along the container walls where it would escape the density and activity of the activated carbon bed. This is the purpose of the diffusion rings on the internal walls of the container, later referred to in detail, and also the reason for maintaining a uniform mechanical pressure over the entire bed of activated carbon.

It is a further object to cause a smooth, turbulent-free flow of air in a straight line through the after filter of activated carbon and through the open center of the coil spring which holds the activated carbon compacted, into the center of the centrifugal impeller, to drive the air tangentially under pressure into the angularly adjustable rotatable scroll, and through a final filter for delivery to the adjacent atmosphere.

Due to the larger pressure drop across the fibrous filter and the activated carbon bed, conventional type fans and propellers tend to allow too much slippage of air around the hub and fan tips from the pressure side to the suction side. This condition dilutes the delivered air with polluted air, thus reducing the overall efficiency of the air purifier. It is an object of the invention to avoid such contamination. In order to provide adequate adsorption of the toxic pollutants by the activated carbon definite limits have been set as to the velocity of air to which a particular bed of activated carbon can be subjected, in order to be effective. Previous inventions have limited their effectiveness to merely "de-odorizing" because of the large volume (200–400 cubic feet per minute) through a thin panel of loosely held activated carbon (see Mason U.S. Pat. No. 3,936,284). Air is not purified to an extent required to make it fit for human breathing by taking out only airborne particulates and yet allowing toxic gases to pass through or vice-versa. The removal of toxic gases is by far the most difficult to effect on an economical portable basis, and in this respect the present invention is highly advantageous.

BRIEF DESCRIPTION OF THE DRAWINGS

FIG. 1 is a longitudinal, vertical axial section taken along the line 1—1 of FIG. 2 looking in the direction of the arrows;

FIG. 2 is a vertical, cross-section taken on the line 2—2 of FIG. 1 looking in the direction of the arrows;

FIG. 3 is an end view (with part broken away) taken from the right of FIG. 1;

FIG. 4 is a front end view taken from the left of FIG. 1 with part of the molded end screen broken away to reveal the pre-filter screen and the high efficiency particulate filter and also the manually contractible-expansible locking ring for holding in place the filter screen which covers the adjacent end of the central filling of activated carbon in granular form; and FIG. 5 is a fragmentary elevational view of the inside of the retainer ring 6 with the bayonet slot 28 therein for mounting the said ring 6 on the pins 29, one of which is shown in FIG. 5 and a like illustration is shown in dotted lines on FIG. 1.

DETAILED DESCRIPTION OF THE DRAWINGS

The portable air purifier herein disclosed and claimed comprises an outer molded two-part longitudinally divided cylindrical shell 24–25 into the open left hand end of which (see FIG. 1) there is inserted a short cylindrical molded plastic split sleeve 4 the outer end of which has a bell flange 4a in which is sealed an inlet screen 1 which is held therein by friction and which is readily removable. The screen 1 has a cylindrical flange which extends toward and fits inside of the sleeve 4 of the shell 24 and said flanged screen is filled with the pre-filter 2 consisting of a pad of spun fiber glass or similar inert, synthetic material. The pre-filter 2 is retained by friction within the offset flange 4a of the two-part split cylindrical container 4 which is held by friction in the open end of the main two-part cylindrical shell 24–25. The pre-filter unit consists of the screen 1 and the pre-filter pad 2 which is made of spun fiber glass and is seated in the annular recess of flange 4a of the cup shaped high efficiency filter shell 24 which is constructed of two matching halves split longitudinally. These matching halves of the shell 24 embrace the contained mass of high efficiency particulate air filter adsorbent material 8 consisting of a folded webb of woven fiber which is efficient for removing particulates of 0.3 micron or larger. The fiber material preferably is made of spun glass.

These two longitudinally extending semi-cylindrical filter shell parts 4,4 are embraced by the adjacent ends of the outer main shell parts 24,25 consisting of the two matching half tubes having their edges joined at an offset split surface on each side extending longitudinally as shown at the top and at the bottom of FIG. 3. The meeting edges of these two main semi-cylindrical shell parts 24,25 are held together at the overlapping joints 4—4 at the top and bottom of FIG. 1, by the cylindrical embracing bands 5—5. The bands 5—5 which hold the casing halves 24,25 together, in alignment carry integrally formed buttons 30 and 31 which are embraced by suitable eyes in the ends of a carrying strap 23 for carrying and handling the unit. This strap constitutes not only a convenient carrying means but serves to orient, in a favorable manner the location of the screened outlet 21 with the discharge of filtered air in an upward direction when the unit is in the position shown in FIG. 1.

The discharge outlet 21 of the snail shell or scroll shaped casing 13 which embraces and is mounted peripherally about the two casing halves has cylindrical flanges 33,34 embracing the main tubular shell 24, 25 and is rotatable thereon to bring the screened outlet 21 into any angular position around the longitudinal axis of the device. The user may select the direction of the discharge. The expansible locking ring 26 in the groove 35 maintains the screen frame 6 against axial displacement.

The opposite end of the body of activated carbon 8 is engaged by a screen 7a mounted in a circular frame 9 which carries screen 7a, is guided for sliding movement, on the inside of the main casing, and occupying the cross-section of the same. A compression spring 11 rests against the outer edge of the screen carrying ring 9, and at its other end presses against an annular flange or spring anchor 32 to hold the granular activated carbon in compression between screens 7 and 7a at all times.

The body of activated carbon 8 should be held in undisturbed condition to gain its maximum beneficial effect. It is to be noted that in the operation of the device, air is drawn through the body of activated carbon against the pressure of the spring 11 and its screen 7a to avoid the packing effect which will be produced by having the spring pressure and the suction effect of the bore work in the same direction.

The shell is perforated by a pair of peripherally disposed openings 26a in a plane transverse to the axial line of the casing shell. These perforations are provided for the insertion of holding pins (not shown) that are inserted to overhang the top of the screen ring 9 to provide room for a fresh filling of activated carbon, when the spent carbon is removed.

The main casing sections or matching halves 25 are provided on their inner peripheries with annular radially inwardly extending ribs 41 serving the purpose of interrupting any channeling which might tend to form and permit air leakage between the inside surface of the containing shell and the body of activated carbon particles.

The two main shell halves are held in circumferential register along their longitudinal edges by the interrupted or offset radial joints at their meeting edge. These edges are held against displacement radially and circumferentially by the encircling bands 5–5a which embrace the cylindrical surfaces in a radial direction and engage endwise the annular radially extending rings 35a–34 adjacent the discharge end of the device. A similar band 5a at the right hand end in FIG. 1 performs like service of holding the casing halves firmly together. Each of these bands 5 and 5a carries a button 30 and 31 extending radially from the casing. The carrying strap 23 has eyes at its end which eyes receive the shank of the button at each end to form a handle and carrying strap. Since the outlet from the discharge volute is rotatable about the axis of the cylindrical body the angular location of the carrying strap may remain fixed.

The snail shell shaped air discharge fitting or scroll 13 embraces and is co-axial with and rotatable on the cylindrical shell of the device. Within the main cylindrical shell 24–25 at the right hand end of the shell, as shown in FIG. 1, the blower motor 16 is mounted as by means of the screws 14—14 upon the circular mounting plate 15 (see FIG. 1). The closure and mounting switch plate 19 is perforated to provide cooling openings 19a, 19a for air cooling the motor 16. The frame of the motor 16 is mounted at its left hand end as viewed in FIG. 1 upon the transverse plate 15 of circular outline, the peripheral edge of which fits within the adjacent end portion of the cylindrical shell, 4 being held in a groove 15a formed in the insides of the two casing parts. The rotatable shaft 16a of the motor enters the hub 12 of the centrifugal impeller 37 which has radially short involute fan blades 37a between the front and the back plates of the impeller. The blades are designed to produce a substantial tangential pressure. The rotatable shaft 35 of the motor enters and is held in the hub 12 of the centrifugal impeller 37 which has approximately involute fan blades of short radial length, said fan blades being disposed in axial parallelism between the front and back plates of the impeller. The space between the blades is open radially inwardly towards the center for the admission of air entering from the filter bed 8 through the end screen 7a and outwardly into the volute 13 as indicated by the arrows in FIG. 2. The frame of the motor 16 is mounted upon the transverse plate 15 of circular outline. Said plate 15 fits within a groove formed on the inside wall of the adjacent end portions of the main cylindrical shell (two-part) 24-25. The screen 7a is pressed against the activated carbon filter by the spring 11 (as shown in FIGS. 1 and 2).

The discharge of air peripherally from the impeller is conducted in a spiral outwardly expanding path through expanding involute shaped duct 13 which projects from the sidewall of the instrument. The outer end of the discharge duct 13 is covered by a guard screen 21 of open mesh.

The scroll or involute shaped discharge fitting 13 has its ends extended in an axial direction with respect to the main casing my means of cylindrical flanges 33 and 34 which embrace the cylindrical shell between annular shoulders on the shell and the band 5a. The operator may, by rotating the scroll 13, (see FIG. 2) reduce the circumferential dimension of the opening between the discharging blades of the impeller and the freedom of passage of the discharge air through the outlet thereby restricting the volume of the discharge of air from the appliance.

Replacing of the spent filtering material may be effected as follows: the molded inlet screen 1 may readily by pulled out of the cylindrical seat in the flange 4a where it is held merely by friction. The pre-filter 2 of spun fiber glass or the like synthetic material may be replaced. The supporting ring 26 may be contracted (see FIG. 4) and be removed from the groove in which it is seated by pressing the two end 27—27 (shown in FIG. 4) towards each other and removed from the casing. Thereupon the molded plastic screen retainer ring 6 which has four bayonet slots cooperating with stationary pins, may be released and removed. The central portion of the mass 8 of activated carbon may be depressed against the spring 11 and turned angularly to release the bayonet slot connection between said ring 6 and the stationary pins 29 and be withdrawn from the casing.

Thereupon the granular activated carbon 8 which is regarded as spent material may be discarded.

Then before a fresh charge of activated carbon is introduced the pressure plate or ring 9 is pushed down against the spring 11, and pins which may be furnished as part of the equipment, or nails may be inserted into holes on each side of the main casing as shown in FIG. 1. They are inserted in the openings 26—26 in the walls of the shell.

After depressing the ring or pressure plate 9 against the coil spring 11 insert a pin or nail through each of the two or three holes 26 in the side walls to hold the ring or plate 9 in compressed position to make room for the charge of activated carbon 8 which is then poured into the interior of the casing to rest upon the screen 7a carried as part of the pressure plate 9.

Before introducing a fresh charge of activated carbon, the circular wire screen 7a is set in the annular pressure plate 9. Preferably, a disk (not shown) of fibrous after-filter may be laid upon the ring 10 before laying the wire screen 7a to serve as an after-filter to catch any solid particles which may have been released by the activated carbon in the course of performing its service. After the filling of activated carbon is introduced the screen frame 6 (at the left of FIG. 1) is pressed down on the filling of activated carbon and is locked in place by being depressed against spring 11 and rotated to bring the pin 29 into locking engagement in the bayonet slot 28—28 in the side wall of the container.

Thereupon the locking ring 26 is contracted by pinching the radial ends 27—27 towards each other. The ring is then introduced into the groove 35 and released thereby locking the screen ring 6 and its screen 7 in place in the barrell of the instrument.

Inwardly extending permanent annular ridges 41—41 are formed on the inner walls of the casing sections in matching relation to reduce the likelihood of there being a longitudinally extending gap between the filling of activated carbon and the inner walls of the shell. These rings 41—41 provide a safeguard against leakage, which would by-pass filtration through the activated carbon bed. The mass of activated carbon particles is under constant spring pressure imposed by the compression spring 11 to press the activated particles against each other and against the containing walls in all directions.

The expansible locking ring 26 shown in FIGS. 1 and 4 which may be contracted by pressure upon the finger pieces 27—27 is introduced into the groove 26 in the outer shell and allowed to expand and thereby lock the screen holding ring 6 and its screen 7 in position to restrain the compressed activated carbon granuals between the two screens, namely between the outer screen 7 and the inner screen 7a.

The cricumferential band 5 at the left of FIG. 1 holds the two parts of the shell together in alignment at the front end of the main body and a similar band 5a embraces the two halves of the body adjacent the scroll 13. These bands 5—5a connected by the strap 23.

The cylindrical shell 4 which contains the high efficiency particulate filter of spun glass or the like is held frictionally in the outer end of the main shell 24 under light pressure by its own resilience. The entry screen 1 with the spun fiber glass pre-filter 2 is held frictionally in the outer flange 4a and it may be withdrawn and the fiber filter replaced and the parts assembled in the position shown in FIG. 1.

OPERATION OF THE UNIT

The holding strap 23 being attached to the pins 31-30, the unit may be put into operation, held suspended, or it may be laid on its side or set on its end. The discharge volute 13 with the screened outlet 21 is rotatable on the main body of the device to bring the discharge outlet into any desired angular position. As is above pointed out and as is apparent from FIG. 2 the outlet from the impeller may be restricted from the maximum open position shown in FIG. 2 to a minimum discharge open position when the volute 13 is rotated to a maximum restriction corresponding to a 90° turn of the discharge volute 13 from the position shown in FIG. 2 in a counterclockwise direction. The impeller is driven in the clockwise direction as viewed in FIG. 2 to throw the air tangentially as indicated by the arrows on FIG. 2.

The outlet screen 21 is not intended to act as a dust separator although it may to some extent perform that service, but is intended primarily to prevent the accidential insertion of an article into the volute, from which it might accidentally come into contact with the impeller.

I claim:

1. A portable air purifying filter suitable for personal use comprising a tubular shell which includes two longitudinally matching half-tubes having registering longitudinal offset joints, said joints comprising a longitudinal parallel planar flange on both outer edges of one half tube and planar edge on each outer edge of the second half tube whereby when the edges of both half tubes are assembled and registered with each other, the exterior and interior surfaces of the resulting unitary tube are substantially cylindrical, axially spaced circumferential bands embracing said assembled half tubes to hold the same together in register, a carrying strap attached at its ends to said bands, a screened inlet at one end of the shell and a tangential outlet connected to and positioned adjacent the other end of the shell and a rotary blower with operating motor positioned in the other end of the shell and a filtering medium between the inlet and the said rotary blower.

2. The portable air purifying filter of claim 1 which further comprises a high efficiency particulate filter and an activated carbon filter in series between the inlet and the rotary blower.

3. The combination of claim 2 wherein said rotary blower is mounted in the shell co-axially, and said tangential outlet comprises a tangential discharge fitting, rotatable mounted about the axis of the rotary blower for selectively directing the discharge of the blower in various directions.

4. A filter comprising a substantially cylindrical shell composed of two longitudinally extending semi-cylindrical parts joined by offset longitudinal parallel flanges, the flanges of one part being disposed radially inside and nesting within the flanges on the other part, leaving a smooth cylindrical surface on the inside and on the outside of said shell, a band adjacent each end of said shell embracing said shell and holding said semi-cylindrical parts in circumferential registration with each other, a pre-filter fitting the inlet end of said shell, said pre-filter comprising a screen and a porous fibrous filter sheet extending across said screen, a high efficiency fibrous filter body disposed in said shell and filling the cross-section thereof, a cylindrical body of activated carbon particles disposed in said shell adjacent to but separate from said fibrous filter body by a rigid screen, said screen being attached at its periphery to the inside of the cylindrical shell, a second transverse screen in said cylindrical body resting against the cylindrical body of activated carbon, a compression spring in said cylindrical body engaging the second transverse screen at one end and engaging at the other end the inner periphery of said cylindrical shell to maintain the body of activated carbon under compression and against displacement, and a suction fan having a volute with its inlet communicating with the last said end of the body of activated carbon, said volute being disposed in a plane transverse to the longitudinal axis of the cylindrical shell and having a tangential discharge passage, and a driving motor for said fan said motor being disposed in the end of the shell remote from the inlet end.

* * * * *